(12) United States Patent
Rodgers

(10) Patent No.: US 7,645,326 B2
(45) Date of Patent: Jan. 12, 2010

(54) RFID ENVIRONMENTAL MANIPULATION

(76) Inventor: James Neil Rodgers, 8853 214th Place, Langley, BC (CA) V1M 2H9

( * ) Notice: Subject to any disclaimer, the term of this patent is extended or adjusted under 35 U.S.C. 154(b) by 500 days.

(21) Appl. No.: 11/672,525

(22) Filed: Feb. 8, 2007

(65) Prior Publication Data

US 2008/0197144 A1 Aug. 21, 2008

(51) Int. Cl.
 *B01D 46/00* (2006.01)
(52) U.S. Cl. .............................. 95/273; 75/235; 222/1; 340/627; 343/781 P; 343/912
(58) Field of Classification Search .................. 95/273; 222/1; 340/627; 343/781 P, 912; 75/235
 See application file for complete search history.

(56) References Cited

U.S. PATENT DOCUMENTS

| | | |
|---|---|---|
| 4,762,426 A | 8/1988 | Foss |
| 5,003,186 A | 3/1991 | Chang |
| 6,019,476 A | 2/2000 | Kirschner |
| 6,628,239 B1 | 9/2003 | Hilliard |

OTHER PUBLICATIONS

Firewall Protection for Paper Documents. RFID Journal, Feb. 11, 2004, RFID Journal, Inc., U.S.A., http://www.rfidjournal.com.

T.Laha, K. Balani. A. Agaral, S. Patil, S. Seal, "Synthesis of Nanostructured Spherical Aluminum Oxide Powders by Plasma Engineering", Metallurgical and Materials Transaction, vol. 36, No. 2, Feb. 2005, p. 301-309.

Chhipa, G.M. and Patel, B.M., "Night-time changes in field strength of 11.8 MHz radio signals over Colombo-Ahmedabad transmission path," Indian Journal of Radio and Space Physics, vol. 2, Jun. 1973, p. 148-152.

Thomas, William, "Air Traffic Controllers Concerned Over Chemtrails", http://www.rense.com/general20/cc.htm.

*Primary Examiner*—Duane Smith
*Assistant Examiner*—Christopher P Jones
(74) *Attorney, Agent, or Firm*—James Neil Rodgers

(57) ABSTRACT

A system and method to reduce signal to noise ratio within an RFID enabled warehouse or distribution center by introducing highly reflective aluminum oxide particulate into the atmospheric environment of the warehouse or distribution center. The aluminum oxide will be comprised of nano size particulate manufactured in an aerosol format. This particulate will be introduced into the environment through the auspices of the heating, ventilation and air conditioning mechanism associated with the environment. The levels of particulate will be monitored through the use of strategically placed sensors in order to maintain regulatory compliance. Furthermore, the signal to noise ratio will be enhanced by reducing ambient noise emanating from light fixtures in the environment through the strategic placement of inferential filters. Furthermore, the signal to noise ratio from man made sources will be reduced by using horizontally configured backscatter transmitting antenna within the environment.

6 Claims, No Drawings

RFID ENVIRONMENTAL MANIPULATION

This invention relates to an RFID system and method of decreasing the signal to noise ratio within a warehouse or product distribution center. Pursuant to this method, aluminum oxide is introduced into the atmosphere of the warehouse or product distribution center (hereinafter known as the "environment"). The aluminum oxide is introduced only when the environment is vacant of human employees or management, preferably at nighttime, when radio wave propagation is at its highest rate of efficiency. This method uses aluminum oxide particles, introduced in minute or nano particle form, which act as reflectors of radio frequency transmissions. The reflectors increase the strength of the radio frequency signal within the environment thereby reducing the signal to noise ratio. The reflectors also act to keep the noise of competing environments out. For example, competing environments may also be emitting electromagnetic signals for their own RFID purposes. These, and other man made noise sources, such as fluorescent lighting or neon lighting, significantly increase the signal to noise ratio within the environment. Furthermore, the system of this invention contemplates the use of light fixture filters to reduce the ambient or ultra-violet noise emanating from the environment lighting system. In this fashion, a nighttime, or electromagnetic quiet situation, is simulated. Furthermore, the system of this invention contemplates the use of horizontally polarized transmissions from the transformer/antenna/radio unit which is located within the environment.

The system of this invention involves a retransmission of a remote interrogation signal from a source, such as a cellular telephone transmission tower, (hereinafter the "remote interrogation signal"). The system of this invention involves an antenna, external to the environment, which gathers, captures and collects the initial microwave electromagnetic signal which comprises the remote interrogation signal. This antenna then retransmits the remote interrogation signal through a process of modulation and re-radiation in an attachment to the antenna known as a transformer. The retransmitted electromagnetic signal is greatly enhanced in an atmosphere charged with aluminum oxide nano particulate. According to this invention, the aluminum oxide nano particulate (hereinafter the "particulate") is safely, pursuant to governmental safety regulations, introduced into the environment through the heating, ventilation and air conditioning apparatus (hereinafter "HVAC"). The external antenna is required as the particulate introduced into the environment would reflect the microwave remote interrogation signal before it entered the environment. Therefore, there is a need to capture the initial microwave interrogation from the remote interrogation signal and re-radiate this signal through a transformer. The transformer is connected by wire to the external antenna and the transformer is located within the environment under the cover of the particulate. In this manner, the re-radiated electromagnetic signal is reflected and intensified within the environment. It is contemplated by this invention that there will be a number of transformers within the environment. The concept of this invention is to properly blanket the environment with a consistent electromagnetic signal. All transformers will be connected by wire to the external antenna.

The remote microwave interrogation signal can be initiated by management of the environment. In this manner, inventory can be calculated at any time, without the need for employee input and on a time table determined by management. It is contemplated in this invention that the external antenna can uplink the data retrieved from the RFID tags back to the remote interrogation signal site or directly to the computer database controlled by the environment management team.

Part of the method of this invention entails the methodology of manufacture of the particulate in such a composition as to be easily and safely introduced into the environment through an aerosol formulation stored and distributed in canisters, or some other convenient method of storage and delivery which has been approved by regulatory agencies. Part of the method of this invention contemplates the recovery of aluminum oxide as waste by-product from an aluminum smelter. Aluminum oxide is a waste by-product of the aluminum manufacturing process. Air emissions created during the aluminum smelting process come from a number of aluminum manufacturing sources. The grinding of bauxite, calcinating the aluminum oxide and handling materials produce airborne particulates. Air emissions equipment is used extensively to capture these particulates. The particulates may be metal rich. If the metallic content is sufficient, the emissions control dust can be remelted to capture any remaining metals or it may be otherwise reused or sold for its metallic content. If the dust is not sufficiently metal rich, it is usually landfilled. The particulate earmarked for the landfill is the waste by-product contemplated for use by this invention. Furthermore, the method and system of this invention contemplates levels of particulate which are deemed safe in an environment to be inhabited by human beings yet at levels which significantly increase the strength of electromagnetic radiation and propagation.

Furthermore, the system of this invention entails a methodology of placement of a light filter system on light fixtures in the environment which has the effect of reducing ambient radiation noise from lighting fixtures in the environment thereby reducing the signal to noise ratio. Scientific studies, specifically "Night-time changes in field strength of 11.8 MHz radio signals over Colombo-Ahmedabad transmission path," by Chhipa, G. M. and Patel, B. M. indicates that there is a sharp post-sunset maximum in radio signal strength of a value of 10 to 12 times. It is theorized that radiation from the sun excites ions in the ionosphere. Electrons are produced when the sun's radiation collides with uncharged atoms and molecules. Since this process requires solar radiation, production of electrons only occurs in the daylight hemisphere of the ionosphere. This ionosphereic excitation causes radio wave propagation to be absorbed. This absorption in the D level of the ionosphere is critical to fade out in the high frequency band widths. As night falls and this sun excitation decreases there is a direct correlation to signal strength in the high frequency bands. These are the bands used by RFID tags for backscatter transmissions. Therefore, a replication of this night-time like electromagnetic quiet time is one of the inventive steps of this invention.

Furthermore, the system of this invention contemplates the use of horizontally polarized transmissions from the transformer/antenna/radio unit which is located within the environment. Most Gen 2 RFID tags have an omnidirectional backscatter capability. The antenna placed in the transformer (s) located within the environment can be configured to transmit omnidirectionally, vertically, elliptically or horizontally. Most man made communication is vertically polarized. For example AM radio broadcasts, two way mobile communications, cell phones, and most two way earth to earth communications in the frequency range above 30 MHz use vertical polarization. Horizontal communication was chosen for TV and the original FM broadcast because it provided discrimination against interference from noise. Man made radio noise is predominantly vertically polarized. FM was later changed to elliptical to improve reception to vertical receiving antennas (whip antennas) on cars. Most RFID tags contain dual dipole antennas meaning that they respond to multiple polarizations. The transmitting antenna in the transformer unit can be tuned to propagate radiation in any orientation. It is proposed in this invention that the antenna of the transformer unit located within the environment should be configured to transmit horizontally and then to receive backscatter signals omnidirectionally. In this way the transmit leg of the backscatter transmission from the transformer/antenna/radio located within the environment dictates that the man made noise which may seep into the environment through the aluminum oxide covering can be minimized. This is the same concept used by the horizontal broadcasts of TV. Although the backscatter signal uplink may have multi-path directionality, the transmit downlink function can be initiated in the horizontal plane.

The system of this invention involves a process whereby the transformer transmits a continuous wave radio signal to a passive integrated circuit transponder (hereinafter the "RFID tag"). The RFID tag is embedded or attached to articles on the shelves in the environment. The RFID tags modulate the continuous wave signal using a modulated backscattering reflection of the electromagnetic radiation as transmitted by the transformer. The transformer signal is greatly enhanced by reflecting off of the aluminum oxide particulate introduced into the environment through the HVAC system. The nighttime environment, or simulation of electromagnetic quiet time, also enhances electromagnetic signaling thereby reducing the signal to noise ratio. This is accomplished through the placement of specifically manufactured filters upon the lighting fixtures within the environment. Horizontal transmission of the downlink from the transformer also reduces signal to noise ratio. This method and system extinguishes or weakens electromagnetic noise in the environment. The system and method of this invention has utility in that it enhances the read rate of the tags. Furthermore, this invention has utility in that it enhances the awaken response required by the passive RFID tags. The system and method of this has further utility by enhancing the read/write capability to RFID tags.

This system has further utility in the specific area of inventory management or derivatives thereof. For example, the initial downlink of the remote interrogation signal through the antenna/transformer and re-radiated to the RFID tags allows the RFID tags to be identified to the interrogating source or directly to management computers. This is useful in a warehouse or distribution center whereby managers/employees are required to know the quantity and availability of articles, product or consumables on the shelves of the environment. A unique identifier number attached or embedded to the articles, product or consumables via the RFID tag is reported back to the remote interrogation signal through the auspices of an uplink signal. The electromagnetic downlink and uplink signals are enhanced and maximized in the environment through the manipulation of particulates and nighttime (electromagnetic quiet time) environment and horizontal transmissions as discussed herein. Therefore, maximum and stable interrogation power is available at minimum power input from the transformer. This is a direct result of a significant reduction in signal to noise ratio. This method and system gains its efficacy from the physical properties exerted by the particulate, the nighttime environment simulation and horizontal polarization on electromagnetic signals.

The transformer system of this invention involves the external antenna gathering an RFID electromagnetic signal interrogation message from a remote source, such as a cellular telephone transmission tower. This interrogation will be in the microwave frequency range to obviate any regulatory or governmental issues with bandwidth or frequency. The microwave frequency also aids to produce high speed electromagnetic signal transfer. Furthermore, the microwave frequency is capable of handling a much heavier information load than lower frequencies. Pursuant to this invention the external antenna receives this electromagnetic interrogation signal from the cellular telephone transmission tower and passes this signal via a wired or wireless connection to an electrical transformer located within the environment. According to this invention the transformer then interrogates the RFID tags embedded or attached to the articles on the shelving units in the environment through a transmission and receiving antenna contained within the transformer. During this process the transformer transmits a continuous wave radio signal to the RFID tag. The RFID tag modulates the continuous wave signal using a modulated backscattering reflection of the electromagnetic radiation transmitted by the antenna connected to the transformer. This modulated backscatter allows signals to be passed between the RFID tags back to the transformer through the antenna connected to the transformer. The initial inquiry is known as the downlink and the backscatter response is known as the uplink. The RFID tag is designed to identify itself when it passes within the signaling range of the transformer and to store data on its integrated circuit for retrieval at a later time. This procedure can be used for the purposes of inventory management or some other useful application. The RFID tags are embedded or attached to the articles by the original article manufacturers. The RFID tag interrogation is conducted at maximum allowable power; fewer than two watts. This system contemplates a wall socket power source for the transformer. The transformer receives the microwave interrogation signal and returns electromagnetic information via a wired or wireless connection between the transformer and the external antenna. The external antenna receives the interrogation from the remote interrogation source, for example a cellular telephone transmission tower. The transformer then modulates and re-radiates the electromagnetic interrogation signal of the remote interrogation source to the embedded or attached RFID tags. This modulated and re-radiated interrogation is conducted at the resonant frequency programmed into the integrated circuit of the RFID tag. The RFID tag responds to the transformer interrogation through the industry standard backscatter methodology. This backscattered electromagnetic signal is modulated and re-radiated back to the external antenna in the identical microwave frequency of the initial electro-magnetic signal interrogation. Instantaneously, this modulated and re-radiated backscattered electromagnetic signal is transmitted via the external antenna, on a designated microwave frequency, back to the original inquiry source or directly to management computers. Radio transmission apparatus in the transformer is the source of the radiated electromagnetic signal which is used to activate and then interrogate the RFID tags. This apparatus is also used to modulate the backscatter answer into microwave and to transmit this electromagnetic information back to the remote interrogating signal or to management computers through the external antenna. It is contemplated by this invention that the method of manufacture of the delivery mechanism for the particulate, whether via canister or other viable system, conform to all governmental safety regulations. This invention contemplates the use of sensors located within the environment to monitor the levels of particulate. These sensors would give a constant readout to management computers and have an automatic shutdown sequence if governmental safety levels are exceeded at anytime.

BACKGROUND—DESCRIPTION OF PRIOR ART

The prior art presents a patent application by Rodgers, Application Number 11627383, Title—"RFID system of modulation and re-radiation; remote interrogation" which sets out the system and method of remote interrogation using microwave cellular transmission towers as a base source. These interrogation signals are received by a super antenna at an environment, sent to a transformer at or near the warehouse shelving, then modulated and re-radiated to RFID tags embedded or attached to warehouse articles at the resonant frequency of the tags. The downlink and uplink are as stated herein and to that extent this patent writes on the Rodgers application. However, the useful, non-obvious and novel step herein is to manipulate the environment through the use of particulate and a nighttime simulation lighting filtration system to be used on environmental lighting fixtures and horizontally polarized transmissions.

The present invention takes the initial interrogation by an electromagnetic inquiry signal of a defined area, such as a warehouse or distribution center, and enhances the quality of said signal through environmental manipulation. This inventive step allows the signal to noise ratio in the environment to be greatly reduced. This reduction allows for a greater transmission success ratio, in other words an increased read rate by RFID tags, while a decreased power level is required from the transformer. This result is due to the physical properties of particulate and nighttime simulation and horizontal polarization upon radio wave propagation.

Prior art can be found in a Feb. 11, 2004 article located in RFID Journal outlining nanometric material or tiny particles of chemicals with varying degrees of magnetism which resonate when bombarded with electromagnetic waves from an RFID reader. Pursuant to this piece of prior art each chemical emits its own distinct radio frequency or note. This note is picked up by the reader and all the notes emitted by a specific mix of different chemicals are interpreted as a binary number. This prior art system uses 70 different chemicals with each chemical assigned its own position in a 70-digit binary number. The primary usefulness of this piece of prior art is to protect paper documents. This is done by embedding or printing the tiny chemical particles on paper. For example, readers can be placed inside copy machines to prevent unauthorized copying. This prior art is marketed as a firewall for paper documents. The present invention can be distinguished from this piece of prior art in that the particulate contemplated herein is comprised of aluminum oxide only and is contemplated to be used to reflect electro-magnetic signals for the purposes of decreasing signal to noise ratio.

Powerful pulsed beam radiation has been known to the art since the early work of Nicolai Tesla and his radio scalar physics experiments. Tesla theorized the superheating of the ionosphere using radio transmissions. Ionospheric heaters as a class of research instruments are nothing new; they have operated in Puerto Rico, the former Soviet Union and Tromso, Norway operated by Max Planck Insitut fur Aeronomie. U.S. military research has focused radio-frequency beams at the ionosphere to boil targeted locations. A tool is used to focus and steer the radio frequency energy upward. This research, known as HAARP (High Frequency Active Auroral Research Program) research project, is jointly sponsored by the U.S. Air Force and U.S. Navy. HAARP has demonstrated that bouncing directed radio frequency transmissions off of the ionosphere can have dramatic effects in the power of communications and success of transmissions to submerged submarines.

Prior art includes U.S. Pat. No. 6,628,239 by Hilliard dated Sep. 30, 2003 which refers to the military use of scattering devices, including chaff. This invention is designed to reflect or deflect electro magnetic signals. It can be distinguished from the present invention in that an industrial warehouse application is contemplated to reduce signal to noise ratio and to enhance electromagnetic signal power using particulate as a reflector.

Other research in the art indicates that a transmitting antenna aimed to radiate at or near the horizon has the best chance of the signal reaching the ionosphere at a shallow angle and therefore returning to the earth at a great distance. In essence, electromagnetic signals can be bounced off of the ionosphere which has the effect of multiplying the transmission power of the signal.

Furthermore, research indicates that a great deal of electromagnetic signal interference is man made noise which includes ignition noise, neon signs, electrical cables, power transmission lines and welding machines. These noises can be exacerbated by ionospheric propagation or as a result of other environments working at the same frequency. This invention proposes that introducing aluminum oxide into the atmosphere of the environment will keep the noise of other competing RFID applications and man made noise out while reflecting the genuine and desired electromagnetic signal to the target RFID tags.

Prior art includes U.S. Pat. No. 4,762,426 by Foss which contemplates aluminum oxide being used to increase reflectivity as a multilayer dielectric. This invention contemplates a remote passive condition sensor apparatus such as a temperature or humidity sensor where it is not feasible to have electrical connections. The aluminum oxide is suggested as an indicator of temperature change as an agent of reflectance. This can be distinguished from the present invention in that the Foss invention does not contemplate aluminum oxide reflection as a means and system of reducing signal to noise ratio in a warehouse or distribution center environment.

The prior art includes a U.S. Pat. No. 5,003,186 by Hughes Aircraft which contemplates using aluminum oxide to ameliorate the effects of global warming. The Hughes invention can be distinguished from the present invention in that the present invention contemplates reflecting energy back into an environment. The Hughes patent contemplates reflecting sunlight back out into space. Hughes spraying, as described herein, is well known in the art. It is of concern to air traffic controllers who must route air traffic around sprayed areas as the aluminum oxide interferes with their radar systems. The aluminum oxide presents on Air Traffic Control radars as a "haze."

Prior art concludes with an academic paper by T. Laha, K. Balani, A. Agaral, S. Patil, and S. Seal titled, "Synthesis of Nanostructured Spherical Aluminum Oxide Powders by Plasma Engineering". This article discusses the various methods of manufacturing aluminum oxide particles by a process of plasma atomization resulting in a narrow size range distribution of spherical nanostructured powders. The invention herein can be distinguished as it contemplates the recycling of aluminum oxide recovered from aluminum smelters.

SUMMARY OF THE INVENTION

The useful, non-obvious and novel steps in this invention which moves it beyond the prior art can be summarized as:

1.) The means of recovering aluminum oxide as waste material from an aluminum smelter and the means of manufacturing same into a delivery system for introduction to the environment through the HVAC infrastructure;
2.) The system of safely introducing aluminum oxide into the environment;
3.) The system of creating a nighttime, or electromagnetic quiet time, in the environment through the use of lighting fixture filters;
4.) The system of horizontal polarization:

All of the above are for the purpose of reducing the signal to noise ratio in the environment and thereby enhancing the desired electromagnetic signals.

This invention is in response to a couple of RFID industry challenges.

First, there is the challenge of waking up the passive RFID tag. In order for a passive tag to reflect or backscatter a radio signal to the reader it must first gather enough energy from the signal of the reader in order to reach an excitation level of roughly 1.2 volts. This is the threshold energy required to arouse the integrated circuit contained within the RFID tag. As this invention contemplates a microwave remote interrogation it is clear to the inventor that operation in either the 2.45 MHz or 5.8 MHz bands will have problems in terms of reflections or refractions from metal surfaces located in the environment. Normally, passive tags struggle to operate around metal and are sensitive to the dielectric constant of metal. Accordingly, shelving and environmental materials, such as metals or liquids, can reduce the amount of electromagnetic energy which is effectively transmitted to the tag from the reader. The result may be that the tag harvests insufficient energy from the reader to sufficiently awaken itself. This invention addresses this RFID industry problem by using a transformer to re-radiate a consistent strength interrogation signal at a much lower frequency than the initial microwave inquiry. This allows the signals to penetrate the articles, whether contained by metals or liquids, and not to be adversely affected by reflection or refraction on metal or liquid which is the norm for the much higher frequency microwave electromagnetic energy. This invention proposes the useful, non-obvious and novel steps of introducing aluminum oxide particulate into the environment which effectively keeps the good inquiring radiation in the environment and keeps the disruptive noise out. This inventive step effectively reduces signal to noise ratio.

In a preferred embodiment the aluminum oxide would be recovered as a waste by-product from an aluminum smelter. This by-product would be effectively recycled so that the particulate met or exceeded Material Safety guidelines published by the U.S. government. The formula for aluminum oxide is $Al(2)O(3)$. It can be toxic if inhaled in large quantities. It can cause coughing, mucous production and shortness of breath. However, introduced at safe levels into the environment, there should be no such health risk. There is no known acute health effects recorded for ingestion or through skin contact.

Second, there is the challenge of insufficient energy to backscatter or reflect the energy of the initial read. As in the paragraph above, the identical energy problems are evident to the inventor. Specifically, the electromagnetic signal quality must be of high enough power to overcome the obstacles posed by environmental problems, such as reflection or refraction by metals and liquids or ambient and competing radio frequency noise. This is known as the signal to noise ratio. Furthermore, there is an inherent compromise in the design of passive tags. They must have the ability to both collect and backscatter an electromagnetic signal. This is a tradeoff which can result in a low power transmission meaning far less than 100% read rates. In other words, the result is often a low signal to noise ratio. The solution, as presented by the inventor, is to provide a consistent power level; this is accomplished through the reflective characteristics of the aluminum oxide particulate in the environment and the noise reduction capability of lighting fixture filters. It is proposed in this invention that lighting fixture filters be utilized to reduce ambient electromagnetic noise in the environment. This inventive step is pursuant to the Shannon-Hartley theorem. This theorem states the relationship between channel bandwidth, channel capacity and the signal to noise ratio of the system. This theorem effectively measures the additive white Gaussian noise which is present during the electromagnetic signal transmission.

Commercially manufactured inferential filters are made by deposition of materials in layers which block some wavelengths by interference. These filters let other wavelengths pass. These filters are sensitive to the angle of incidence of incoming light. The spectral transmittance varies with the angle of incidence. In placing these filters on light fixtures in the environment the "noisy" wavelengths can be filtered out thereby simulating a nighttime, or electromagnetic quiet time, in the environment.

The inventor is aware that oxide can accumulate upon RFID tags. This accumulation can have the effect of diminishing RFID tag performance. This is of particular concern where RFID tags are connected to aluminum antennae. However, the amount of particulate to be introduced into the environment pursuant to this invention is minute. Furthermore, the RFID industry has devised a remedy. Specifically, Symbol Technologies coats its RFID tags so that this oxide accumulation problem does not manifest. It is known that copper antennae are more resistant to oxide build up. Therefore, this invention contemplates the use of coated aluminum antennae or tags connected to copper antennae as a preferred embodiment.

What is claimed is:

1. A system to reduce signal to noise ratio within a Radio Frequency Identification (hereinafter referred to as RFID) enabled warehouse or distribution center, the system comprising a means for safely introducing aluminum oxide recovered as a waste by-product from an aluminum smelting process into a warehouse or distribution center environment (hereinafter referred to as the "environment"); said means comprising a means of manufacturing the recovered aluminum oxide into a safe and reliable aerosol delivery system, and said means further comprising safely introducing the recovered aluminum oxide into the environment through the auspices of a heating, ventilation, and air conditioning system (hereinafter referred to as "HVAC") attached to the environment; and a means for monitoring the levels of aluminum oxide within the environment.

2. The system of claim 1 whereby the aluminum oxide is reduced to nano particulate (hereinafter referred to as the "particulate") for the purpose of introducing said particulate into the environment for the function of reducing signal to noise ratio in a radio frequency identification enabled environment.

3. The system of claim 1 whereby the particulate is introduced into the environment through the auspices of the HVAC for the function of reducing signal to noise ratio in a radio frequency identification enabled environment.

4. The system of claim 1 whereby the amount of particulate accumulating within the atmosphere of the environment is monitored by remote sensors placed at strategic locations within the environment which sensors automatically shut down the HVAC system of particulate introduction when levels of particulate within the atmosphere of the environment exceed a level deemed safe, for health purposes, by regulatory authorities.

5. The system of claim 1 whereby aluminum oxide can be recovered from the aluminum smelting industry, as a waste product, or manufactured from base elements, so that the aluminum oxide can be safely stored and transported prior to introduction into the atmosphere of the environment.

6. The system of claim 1 whereby the particulate is manufactured as an aerosol for the purposes of coupling with the HVAC.

* * * * *